United States Patent [19]

Higashiyama et al.

[11] 4,266,975
[45] May 12, 1981

[54] ANTICORROSIVE COATING COMPOSITION

[75] Inventors: Takao Higashiyama; Toshio Nishikawa, both of Yokohama, Japan

[73] Assignee: Diamond Shamrock Corporation, Dallas, Tex.

[21] Appl. No.: 136,943

[22] Filed: Apr. 3, 1980

[30] Foreign Application Priority Data

Apr. 6, 1979 [JP] Japan .................................. 54-41052

[51] Int. Cl.³ .............................. C09D 5/10; 148 6.2
[52] U.S. Cl. ................................ 106/1.12; 106/1.17; 106/14.21; 148/6.2; 252/387
[58] Field of Search .................. 106/1.12, 1.17, 14.21; 252/387; 148/6.2

[56] References Cited

U.S. PATENT DOCUMENTS

| | | | |
|---|---|---|---|
| 3,477,881 | 11/1969 | Wada et al. | 148/6.2 |
| 3,907,608 | 9/1975 | Barsett et al. | 148/6.2 |
| 3,940,280 | 2/1976 | deRidder | 106/193 M |
| 3,990,920 | 11/1976 | deRidder | 148/6.2 |

FOREIGN PATENT DOCUMENTS 972072 10/1964 United Kingdom.

*Primary Examiner*—Lorenzo B. Hayes
*Attorney, Agent, or Firm*—John J. Freer

[57] ABSTRACT

An anticorrosive coating composition comprising particulate metal, a chromic acid constituent, at least one organic liquid substance and a pH modifier if necessary, in which a part of the chromic acid constituent is replaced with boric acid component, is disclosed. Resulting coatings over metal substrates display excellent corrosion-resistant properties in fresh water environments as well as in salt water environments.

16 Claims, No Drawings

ANTICORROSIVE COATING COMPOSITION

BACKGROUND OF THE INVENTION

A variety of materials are known as coating compositions for preventing corrosion of metals (primarily steels), and one of the most effective materials is a composition comprising chromic (acid) anhydride, a particulate metal (mainly zinc or aluminum), a viscosity modifier, an oxohydroxy low molecular weight ether (polyglycol) and a solvent, such as disclosed in U.S. Pat. No. 3,940,280.

This composition is ordinarily offered to users as a combination of a first component containing chromic (acid) anhydride and a pH modifier, and a second component containing a particulate metal and an oxohydroxy low molecular weight ether (such as propylene glycol). The two components are mixed prior to use, applied onto the metal surface in a specified amount and then heated at least for 0.2 second at a temperature of about 200° C. or more to form the coating film.

This composition exhibits superior anticorrosive effect against salt water on steel, but not the same effect against fresh water. Because it contains hexavalent chromium, some consideration may need to be given to environmental pollution. For example, the hexavalent chromium contained in the waste wash water discharged in the course of composition use might first be reduced.

The mechanism of the anticorrosion activity of this composition is, although it is not entirely understood, believed that the chromium oxide (reduction product of the chromic (acid) anhydride, mainly $Cr_2O_3$) acts as bonding material (matrix) for the metal powder, and thus a coating layer is formed on the surface of the metal body, the said matrix having a certain degree of electric conductivity, and the hexavalent chromium remaining in the chromium oxide keeps the metal powder active, thus making the metal powder exhibit the sacrificial protection effect. However, since the conductivity of the chromium oxide itself is very low, the sacrificial protection effect is satisfactorily exhibited in the salt water environments where electrolytes are present in large amounts. But, this same effect is not produced in fresh water environments because the conductivity of the chromium oxide, per se, is low, and the remaining hexavalent chromium is easily leached out.

An anticorrosive coating composition has been sought that will be effective in fresh water as well as that will be highly acceptable environmentally, by seeking a bonding material that would replace the chromic acid. Numerous compositions have been compounded of various molybdic acid compounds, phosphoric acid compounds and boric acid compounds; exposure tests have been conducted; and it has been found that boric acid compounds were effective, by substituting a boric acid compound for a part of the chromic (acid) anhydride.

SUMMARY OF THE INVENTION

The present invention offers a substantially resin-free anticorrosive coating composition for metals comprising at least one boric acid compound and at least one water-soluble chromic acid compound and particulate metal and at least one high-boiling organic liquid and water and/or organic solvent which, when necessary, contains a pH modifier. Further, the composition may contain nonionic dispersing agent and/or viscosity modifier.

In the matrix of the bonding material formed by the composition of the present invention, the leaching rate of the boric acid ions present therein is far slower than that of the hexavalent chromium, the former ions retain the activity of the metal particles well, and they maintain the conductivity of the coating layer well.

In a particular aspect, the composition of the present invention comprises 10 to 40 weight percent of particulate metal; 1 to 12 weight percent of water-soluble acid compounds (boric acid component plus chromic acid constituent); 7 to 30 weight percent of at least one high-boiling organic liquid; and with the remainder being water or water mixed with a solvent, with the composition optionally containing ingredients such as pH modifier and viscosity modifier.

DESCRIPTION OF THE PREFERRED EMBODIMENTS

Water-soluble chromic acid compounds that may be used in the present invention, or as termed herein the "chromic acid constituent," include chromic (acid) anhydride, water-soluble metal salts of chromic acid and bichromic acid salts. Generally speaking, chromic (acid) anhydride is easy to use, although calcium chromate, magnesium chromate, zinc bichromate, potassium bichromate, sodium bichromate, magnesium bichromate, calcium bichromate, etc., can be used, although the potassium and sodium salts are not advantageous. It is desirable that the pH of the final composition be in the range of 3 to 6, and for this reason, it will be useful to add a pH modifier such as listed below when strongly acidic chromic acid compounds are used.

In the present invention, for the "boric acid component" as the term is used herein, it is convenient to use orthoboric acid commercially available as "boric acid," although it is also possible to use various products obtained by heating and dehydrating orthoboric acid such as metaboric acid, tetraboric acid and boron oxide.

In the present invention, percentage of the boric acid component, when the total amount of the chromic acid constituent and the boric acid component being taken as 100 percent, is referred to as "boric acid concentration." When the boric acid concentration is less than 5 percent, it cannot exhibit satisfactory anticorrosive effect in the fresh water environments. When the boric acid concentration exceeds 95 percent, it does no longer exhibit sufficient anticorrosive effect in the salt water environments. and also remarkable bubbling occurs when the two components are mixed and coat-forming capability of the composition is markedly impaired. The preferred boric acid concentrations are 10 to 75 percent, while at 15 to 50 percent, the composition will display superior anticorrosive effect both in the fresh water environments and in the salt water environments.

As the particulate metal ingredient, any metal that has a negative normal electrode potential, the absolute value of which is greater than iron, may be used, but in practice, Zn, Al or their mixture or an alloy of Zn and Al are used. The preferred particulate form is flake, of which thicknesses are on the order of 0.1 to 0.5 micron, and the longest part has a length of 150 microns, generally 15 microns or less.

The high-boiling organic liquid compounds used in the composition of the present invention correspond to "oxohydroxy low molecular weight" organic compounds, e.g., of a molecular weight of 300 or less, socalled in the prior art, that is, polymers of glycol and their low molecular weight ethers, specifically, ethylene glycol, propylene glycol, diethylene glycol, dipropylene glycol, triethylene glycol, tripropylene glycol, tetraethylene glycol, diacetone alcohol and their close homologs as well as their mixtures. It is believed that these substances act as reducing agents on the chromic acid compounds, converting them to chromium (III) oxides. When the composition of the present invention is applied on the surface of a metal and heated, they volatilize slowly as the coating film forms, preferably maintaining liquidity above 100° C. and avoiding boiling volatilization of the solvent and thus enabling formation of a uniform anticorrosive layer.

In the present invention, when the ratio (weight ratio) of the chromic acid constituent and the boric acid component (together called "acid compounds") to the particulate metal is less than 0.05, the acid compounds are insufficient to act as the binder for the particulate metal. It is difficult for them to fill the void between the metal particles and bind them together and simultaneously to bond them to the substrate metal surface. Thus, they will give only coating films of poor adhesion. On the other hand, when this ratio exceeds 1.0, the metal particles are wrapped in a large amount of the binding layer of the acid compounds, and the sacrificial protection activity is no longer exhibited. This ratio is preferably between 0.08 and 0.5.

The pH modifier, which is able to adjust the pH of the final mixture to from 3.0 to 6.0, is used to keep the storage stability of the final mixture in the best condition, to prevent deterioration in adhesion and darkening in appearance in the resulting coating, which are caused by too rapid reaction of the metal particles and the acids in the mixture. The pH modifier is generally selected from the oxides and hydroxides of alkali metals, although lithium is the preferred alkali metal because the sodium and potassium compounds are inefficient; or, is selected from the oxides and hydroxides of the metals belonging to the group IIA and group IIB and groups of larger numbers in the periodic table, which compounds are soluble in aqueous chromic acid solution, such as strontium, calcium, barium, magnesium, zinc and cadmium. The pH modifier may also be a compatible carbonate of the foregoing metals, by which is meant the carbonate will be soluble in aqueous chromic acid solution without causing initial, significant chrome reduction, while readily yielding a solution pH above 7 when dissolved in water alone. As said before, the pH modifier need not be used when the chromic acid constituent is not strongly acidic.

In the composition of the present invention, for the purpose of helping the suspension dispersion of the particulate metal, it is possible to add a nonionic dispersing agent, i.e., surfactant, serving as a wetting agent, particularly such as alkylphenol polyethoxy adduct, for example, Nopco 1529 marketed by Diamond Shamrock Corporation of U.S.A. The amount of such surfactant is typically 0.01 to 1 weight percent of the final mixture.

The composition of the present invention in its final mixed form comprises 10 to 40 percent, preferably 15 to 30 percent particulate metal; 1 to 12 percent, preferably 2 to 8 percent acid compounds; 7 to 30 percent, preferably 12 to 25 percent high-boiling organic liquid, with the remainder optionally containing pH modifier, viscosity modifier and additives, e.g., surfactant, all in a water, and/or water mixed with solvent, medium.

The composition of the present invention is preferably presented to users as a first component containing the acid compounds, and the pH modifier when used, in mixture and a second component containing the particulate metal and the high-boiling organic liquid, and the two components are mixed together before use.

The substrate metal to be coated is usally degreased with an alkali cleaner or a chlorine-containing vaporwash solvent. The coating can be effected by various methods such as spraying, roll coating, dipping, method comprising dipping and subsequent centrifugal removal of excess drops, method comprising dipping and subsequent removal of excess drops by vibration, brush coating, etc.

After the substrate metal has been coated, it is heated by a heating method selected from among a hot air circulation furnace (IDG combustion furnace or electric furnace), a far infrared ray heating furnace or an infrared heating furnace, a high frequency induction heating furnace, or these in combination, for at least 0.2 second or more at a temperature of 180° C. or over, preferably for 0.5 second or more at a temperature of 200° C. or more, and more preferably for 0.5 second or more at a temperature of 260° C. or over. The coated and heat-treated metal substrate is let stand at room temperature or subjected to forced air cooling, and when required, coating and heating may be repeated.

Those skilled in the art will understand that the composition of the present invention may contain water miscible organic solvents such as alcohols and ketones, although preferably for economy, the aqueous medium of the composition is simply water. Any further composition additives can include a viscosity modifier, such as water soluble cellulose ether, and other additives within the scope and spirit of this invention, but the composition will be substantially resin-free, i.e., contain little if any resin, such as 5 grams per liter of composition or less, and is preferably completely resin-free.

Now the present invention is explained specifically by way of working examples. The corrosion resistance tests and the evaluation of the test results employed in these examples are as follows.

(1) Salt water (fog) spray test: The neutral salt water spray test described in JIS Z-2371 was followed. The degree of corrosion of the test samples was visually observed and evaluated in accordance with the following standards.

5 points: Absolutely no formation of red rust.
4 points: Formation of ten or less pinholes of red rust.
3 points: Rust spots are distributed and some flow of rust is observed.
2 points: The flow of rust is remarkable.
1 point: The entire surface is covered with red rust.

(2) CASS test. The test method of JIS D-0201-1971 was followed, except that a spray liquid of pH 3.5 was used. Standards for evaluation of the formation of rust are the same as above.

(3) Outdoor exposure test. The test pieces were exposed attached to exposure stands (surfaces facing the south inclined at 30°) in Yokohama, Japan. Standards for evaluation of formation of rust are the same as above.

The used test pieces were 15×15 cm, 0.8 mm thick soft steel plates.

EXAMPLE 1

Sixty parts of metallic zinc flakes (0.1 to 0.3 micron thick, about 15 microns long in average in the longest part) were dispersed in diethylene glycol containing 0.3 part of "Nopco 1529" (alkylphenol polyethoxy adduct surfactant supplied by Diamond Shamrock Corporation of U.S.A.) so as to make the total amount 100 parts. (This mixture is the first component.) Separately orthoboric acid and chromic acid anhydride are dissolved in deionized water so that the orthoboric acid content was 5.17 percent and the chromic acid content was 1.72 percent, and calcium oxide was added as the pH modifier so that the content thereof would be 1.72 percent. The boric acid concentration, basis boric plus chromic acid, is 75 weight percent. (This mixture is the second component.)

The first and second components were mixed in the weight ratio 42:58 by pouring the former into the latter while slowly stirring, and stirring was continued overnight at room temperature. In this mixture, the orthoboric acid concentration was 3 percent, the chromic acid anhydride concentration was 1 percent and the calcium oxide concentration was 1 percent. The mixture thus obtained was applied onto soft steel plates by means of a bar coater to form a uniform film thereon, the plates having been washed with alkali and sufficiently polished with a Scotch Bright Very Fine polishing cloth (supplied by 3M Company of U.S.A.), and the plates were heated in an electrically heated hot air circulating furnace, the temperature of the soft steel plates being held at 300° C. for 4 minutes after the plates reached that temperature, and they were then let stand to be cooled to room temperature. The amount of the applied composition was 1 micron in thickness and 250 mg/ft$^2$ (2.7 g/m$^2$), by weight, per area.

EXAMPLE 2

Coating films were formed under the same condition as in Example 1 except that the final mixture contained 3.6 percent orthoboric acid and 0.4 percent chromic acid anhydride, thereby providing a "boric acid concentration" of 90 percent.

EXAMPLE 3

Coating films were formed under the same conditions as in Example 1 except that the final mixture contained 2 percent orthoboric acid and 2 percent chromic acid anhydride, for a 50 percent boric acid concentration.

EXAMPLE 4

Coating films were formed under the same conditions as in Example 1 except that the final mixture contained 1 percent orthoboric acid and 3 percent chromic acid anhydride, for a boric acid ratio of 25 percent.

EXAMPLE 5

Coating films were formed under the same conditions as in Example 1 except that the final mixture contained 0.4 percent orthoboric acid and 3.6 percent chromic acid anhydride, for a 10 percent boric acid concentration.

EXAMPLE 6

Forty parts of metallic zinc flakes were dispersed in dipropylene glycol monomethyl ether containing 0.3 part of "Nopco 1529," to make the total 100 parts (the first component). Separately, metaboric acid and zinc bichromate were dissolved in deionized water so that the metaboric acid content was 1.67 percent and the zinc bichromate content was 5 percent. The two components were mixed in the weight ratio 40:60 (1 percent metaboric acid and 3 percent zinc bichromate in the final mixture), and after being stirred overnight, it was applied onto soft steel plates by means of a bar coater, said plates having been vapor-washed with trichlorethylene. The thus coated plates were heated in the same manner as in Example 1 except that the plates were heated to 290° C. and were held at the temperature for 7 minutes. Thus, coating films were formed. The amount of the applied composition was 1 micron in thickness and 250 mg/ft$^2$ (2.7 g/m$^2$), by weight, per area.

EXAMPLE 7

Sixty parts of a mixture of metallic zinc flakes and metallic aluminum (with the shapes as described herein before) in the weight ratio 85:15 was dispersed in ethylene glycol containing 0.3 part of "Nopco 1529," to make the total 100 parts (the first component). Separately, boron oxide and magnesium chromate were dissolved in deionized water in amounts such that the boron oxide was 3.08 percent and the magnesium chromate was 3.08 percent, and lithium hydroxide was added in an amount such that the pH of the final mixture was about 4.5 (the second component). The two components were mixed in the weight ratio 35:65 (2 percent boron oxide and 2 percent magnesium chromate in the final mixture). The mixture was stirred overnight at room temperature. Test pieces were treated, coated and heat-treated in the same manner as in Example 1.

COMPARATIVE EXAMPLE

Coating films were formed under the same conditions as in Example 1 except that no boric acid compound was used (that is, ingredients were blended so that the chromic acid anhydride content was 4 percent).

The tests described above were carried out with these test pieces on which the coating films were formed as described above. The results are shown in the following table.

TABLE 1

| Sample | Boric Acid Concentration (%) | Salt Water Spray Test* | CASS Test** | Outdoor Exposure*** Flat Surface | Scribe |
|---|---|---|---|---|---|
| Comparative Example | 0 | 5 | 1 | 3 | 1 |
| Example 5 | 10 | 5 | 2 | 4 | 3 |
| Example 4 | 25 | 5 | 3 | 5 | 4 |
| Example 3 | 50 | 5 | 3 | 5 | 5 |
| Example 1 | 75 | 4 | 3 | 5 | 5 |
| Example 2 | 90 | 1 | 2 | 5 | 5 |
| Example 6 | 25 | 5 | 3 | 5 | 3 |
| Example 7 | 50 | 4 | 2 | 4 | 2 |

*144 Hours
**20 Hours
***6 Months

As will be understood from the table, the composition of the present invention exhibits excellent anticorrosive effect against both salt water and fresh water.

EXAMPLE 8

A final mixture was prepared, the composition of which was as follows.

| Zinc flakes | 15.0%, by weight |
|---|---|
| Nopco 1529 | 0.1 |
| Dipropylene glycol | 8.0 |

-continued

| | |
|---|---|
| Orthoboric acid | 0.3 |
| Chromic acid anhydride | 0.9 |
| Zinc oxide | 0.5 |
| Water | 75.2 |
| Total | 100.0%, by weight |

The final mixture was applied onto test panels and tested in the same manner as in Example 1.

EXAMPLE 9

A final mixture was prepared, the composition of which was as follows.

| | |
|---|---|
| Zinc flakes | 15.0%, by weight |
| Nopco 1529 | 0.1 |
| Dipropylene glycol | 12.0 |
| Orthoboric acid | 0.6 |
| Chromic acid anhydride | 1.8 |
| Zinc oxide | 1.0 |
| Water | 69.5 |
| Total | 100.0%, by weight |

The final mixture was applied onto test panels and tested in the same manner as in Example 1.

EXAMPLE 10

A final mixture was prepared, the composition of which was as follows.

| | |
|---|---|
| Zinc flakes | 30.0%, by weight |
| Nopco 1529 | 0.1 |
| Dipropylene glycol | 20.0 |
| Orthoboric acid | 2.0 |
| Chromic acid anhydride | 6.0 |
| Zinc oxide | 1.5 |
| Water | 40.0 |
| Total | 100.0%, by weight |

The final mixture was applied onto test panels and tested in the same manner as in Example 1.

The test results of Examples 8 through 10 are summarized in the following Table 2.

TABLE 2

| Sample | Boric Acid Concentration (%) | Salt Fog Spray Test* | CASS Test** | Outdoor Exposure*** Flat Surface | Outdoor Exposure*** Scribe |
|---|---|---|---|---|---|
| Example 8 | 25 | 4 | 3 | 3 | 3 |
| Example 9 | 25 | 5 | 3 | 5 | 5 |
| Example 10 | 25 | 5 | 5 | 5 | 5 |

*144 Hours
**20 Hours
***6 Months

With respect to the compositions of Examples 1 through 7, an outdoor exposure test was conducted for one year with test panels on which a 4-micron thick coating was formed. The results of observation of the flat surfaces for each test panel are summarized in the following Table 3.

TABLE 3

| Sample | Rating |
|---|---|
| Comparative Example | 1 |
| Example 1 | 4 |
| Example 2 | 3 |
| Example 3 | 5 |

TABLE 3-continued

| Sample | Rating |
|---|---|
| Example 4 | 4 |
| Example 5 | 3 |
| Example 6 | 5 |
| Example 7 | 5 |

What is claimed is:

1. In a substantially resin-free aqueous coating composition for application to metal substrates, comprising a chromic acid constituent, particulate metal and at least one high-boiling organic oxohydroxy liquid having a molecular weight of 300 or less; the improvement comprising a boric acid component in an amount of 5 to 95% by weight of the chromic acid constituent and boric acid component.

2. The coating composition of claim 1 further containing a pH modifier.

3. The coating composition of claim 1 wherein said particulate metal is metal flake selected from the group consisting of zinc, aluminum, mixtures thereof and alloys of same.

4. The coating composition of claim 1 further characterized by containing nonionic dispersing agent.

5. The coating composition of claim 1 further characterized by containing viscosity modifier.

6. An aqueous anticorrosive coating composition for application to metal substrates according to claim 1 comprising:
   (a) 10 to 40 percent, by weight, of particulate metal;
   (b) 1 to 12 percent, by weight, of a mixture of water-soluble chromic acid constituent and boric acid component, with the boric acid component contributing from 5 percent to 95 percent of said mixture;
   (c) 7 to 30 percent of organic liquid; and
   (d) 0 to 4 percent, by weight, of a pH modifier.

7. The coating composition of claim 6 wherein said pH modifier is selected from the group consisting of oxides, carbonates and hydroxides of alkali metals, metals of group IIA, and group IIB of the Periodic Table of the Elements, and mixtures thereof.

8. The coating composition of claim 6 wherein said particulate metal is selected from the group consisting of zinc flake, aluminum flake, mixed flake of aluminum and zinc and flake of zinc-aluminum alloy.

9. The coating composition of claim 6 wherein the water soluble chromic acid constituent is selected from the group consisting of chromic acid, water-soluble metal salts of chromic acid, bichromic acid salts, and mixtures thereof.

10. The coating composition of claim 6 wherein said boric acid component is selected from the group consisting of orthoboric acid, metaboric acid, tetraboric acid, and boron oxide.

11. The coating composition of claim 6 wherein said pH modifier is selected from oxides, carbonates and hydroxides of lithium, strontium, calcium, barium, magnesium, zinc, cadmium, and mixtures thereof.

12. The coating composition of claim 6 wherein said high-boiling organic liquid is selected from the group consisting of ethylene glycol, propylene glycol, diethylene glycol, dipropylene glycol, triethylene glycol, tripropylene glycol, tetraethylene glycol, diacetone alcohol and mixtures thereof.

13. The coating composition of claim 6 further characterized by containing nonionic dispersing agent.

14. The coating composition of claim 6 wherein the particulate metal content is 15 to 30 percent, by weight, the chromic acid constituent plus boric acid component content is 2 to 8 percent, by weight, and the high-boiling organic liquid content is 12 to 25 percent, by weight.

15. The coating composition of claim 6 wherein the boric acid component is 10 to 75 percent.

16. The coating composition of claim 6 further characterized by being substantially resin-free while containing viscosity modifier.

* * * * *